US012735012B2

(12) United States Patent
Vogel

(10) Patent No.: US 12,735,012 B2
(45) Date of Patent: Sep. 15, 2026

(54) BRAKE BOOSTER ASSEMBLY

(71) Applicant: Polaris Industries Inc., Medina, MN (US)

(72) Inventor: Daniel J. Vogel, Minnetrista, MN (US)

(73) Assignee: Polaris Industries Inc., Medina, MN (US)

( * ) Notice: Subject to any disclaimer, the term of this patent is extended or adjusted under 35 U.S.C. 154(b) by 463 days.

(21) Appl. No.: 18/216,077

(22) Filed: Jun. 29, 2023

(65) Prior Publication Data

US 2025/0001988 A1 Jan. 2, 2025

(51) Int. Cl.
*B60T 13/56* (2006.01)
*B60T 7/04* (2006.01)
*B60T 13/567* (2006.01)
*B60T 17/04* (2006.01)
*B60T 13/58* (2006.01)

(52) U.S. Cl.
CPC ............ *B60T 13/56* (2013.01); *B60T 13/567* (2013.01); *B60T 17/046* (2013.01); *B60T 7/04* (2013.01); *B60T 13/588* (2013.01)

(58) Field of Classification Search
CPC ...... B60T 13/56; B60T 13/567; B60T 13/565; B60T 13/588; B60T 17/04; B60T 17/043; B60T 17/046; B60T 13/57
USPC .................... 188/356, 357; 303/114.3, 115.3
See application file for complete search history.

(56) References Cited

U.S. PATENT DOCUMENTS 2,770,949 A * 11/1956 Randol ................. B60T 13/244 60/553
2,931,180 A * 4/1960 Randol ................. B60T 13/244 91/375 R
3,738,711 A * 6/1973 Rockwell ................ B60T 8/448 303/114.3
5,096,267 A * 3/1992 Volz ...................... B60T 8/4854 91/369.1
6,905,178 B1 * 6/2005 Morlan ................. B60T 13/567 92/128
9,623,912 B2 4/2017 Schlangen
(Continued)

FOREIGN PATENT DOCUMENTS

DE 19523309 A1 * 1/1997 ............ B60T 13/567
FR 2626832 A1 * 8/1989 ............ B60T 13/567
WO WO-2008126941 A1 * 10/2008 .............. B60T 13/57

OTHER PUBLICATIONS

WO-2008126941-A1 (Year: 2008).*
DE-19523309-A1 (Year: 1997).*

*Primary Examiner* — Thomas J Williams
(74) *Attorney, Agent, or Firm* — Merchant & Gould P.C.

(57) ABSTRACT

A vehicle is provided which comprises a plurality of ground engaging members and a frame supported by the plurality of ground engaging members. An engine is supported by the frame, the engine comprising an engine intake that includes an engine intake inlet. A brake assembly comprises a brake output member coupled to at least one ground engaging member of the plurality of ground engaging members, a master cylinder coupled to the brake output member, and a brake booster operably coupled to the master cylinder. Further, the brake booster comprising a body defining a fresh air intake, a conduit extending outwardly from the fresh air intake, and an inlet to the conduit positioned vertically above the brake booster.

19 Claims, 11 Drawing Sheets

(56) References Cited

U.S. PATENT DOCUMENTS

| | | | | |
|---|---|---|---|---|
| 2021/0300472 | A1 | 9/2021 | Thomas | |
| 2025/0001988 | A1 * | 1/2025 | Vogel ...................... | B60T 13/56 |

* cited by examiner

BRAKE BOOSTER ASSEMBLY

FIELD OF THE DISCLOSURE

The present disclosure relates to a brake booster assembly for a brake assembly.

BACKGROUND OF THE DISCLOSURE

Utility and recreational vehicles may require a brake booster assembly to increase the applied braking force. The present disclosure relates to the assembly of a brake booster assembly and the positioning of a brake booster assembly in a utility or recreational vehicle.

SUMMARY OF THE DISCLOSURE

In embodiments of the present disclosure, a vehicle is provided. The vehicle comprises a plurality of ground engaging members and a frame supported by the plurality of ground engaging members. An engine is supported by the frame, and the engine comprises an engine intake that includes an engine intake inlet. A brake assembly comprises a brake output member coupled to at least one ground engaging member of the plurality of ground engaging members, a master cylinder coupled to the brake output member, and a brake booster operably coupled to the master cylinder. Further, the brake booster comprises a body defining a fresh air intake, a conduit extending outwardly from the fresh air intake, and an inlet to the conduit positioned vertically above the brake booster.

In yet another embodiment of the present disclosure, a braking system for a vehicle is provided. The braking system comprises a plurality of brake output members, a brake input member, and a master cylinder configured to supply hydraulic fluid to at least one of the plurality of brake output members. Further, a brake booster may be operably coupled between the brake input member and the master cylinder. The brake booster comprises a casing, a diaphragm positioned within the casing, an input shaft operably coupled between the diaphragm and the brake input member, a boot surrounding at least a portion of the input shaft, and a fresh air intake fluidly coupled to the boot.

In yet another embodiment of the present disclosure, a method of manufacturing a brake booster is provided. The method of manufacture comprises providing a housing, a cover, a diaphragm, an input rod, and a boot. The method further includes inserting the diaphragm into the housing, sealingly coupling the cover to the housing, thereby sealing the diaphragm between the housing and the cover, and sealingly coupling the boot to the cover, and the boot sealed about the input rod.

DETAILED DESCRIPTION OF THE DRAWINGS

Figure 1:
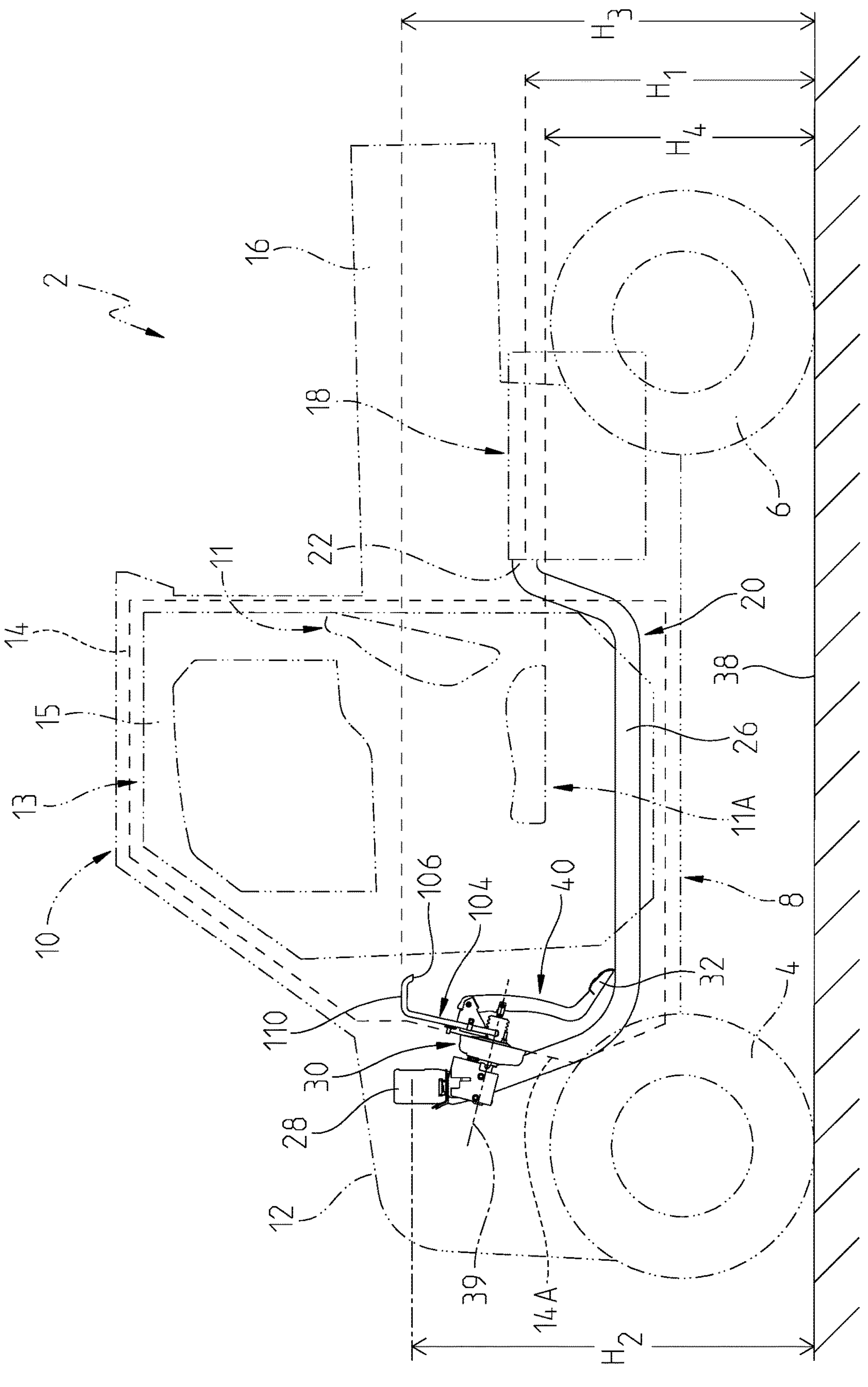
FIG. 1 is a side view of a vehicle of the present disclosure.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler", and variations thereof are used to include both arrangements wherein two or more components are in direct physical contact and arrangements wherein the two or more components are not in direct contact with each other (e.g., the components are "coupled" via at least a third component, but yet still cooperates or interact with each other).

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

As shown in FIG. 1, a vehicle 2 includes a plurality of ground engaging members which includes a front pair of ground engaging members 4 and a rear pair of ground engaging members 6. A frame assembly 8 is supported by ground engaging members 4, 6 and frame assembly 8 supports a body assembly 10. Body assembly 10 generally includes a front portion 12, a cab portion 14, and a rear portion 16. Front portion 12 generally includes a front fascia 34 and a hood member 36. Hood member 36 is generally configured to cover one or more of a powertrain component, an electrical component, a brake assembly component, and other components. Cab portion 14 may be comprised of a front windshield, a rear windshield, a roof, a front panel 14A, and at least one door 15 surrounding an operator area 13. In embodiments, operator area 13 is sealed, semi-sealed, or otherwise configured to have clean or filtered air. In embodiments, operator area 13 is generally an open-air environment and may not have a windshield, may not have doors, may not have a roof, etc. In embodiments, operator area 13 is a positive-pressure environment. In embodiments, operator area 13 includes a dashboard assembly, a console assembly, one or more seats 11, a steering assembly, and other components. Rear portion 16 is generally a box assembly and may be fixed to frame assembly 8 or may otherwise be tiltable relative to frame assembly 8.

A powertrain is supported by the frame assembly 8 and generally includes a prime mover 18 supported by frame assembly 8. Prime mover 18 is operably coupled to at least one of ground engaging members 4, 6 and may be situated rearwardly of the cab portion 14. Prime mover 18 may also be positioned generally vertically below rear portion, or box assembly 16. In embodiments, prime mover 18 is an internal combustion engine (e.g., a gasoline engine, a diesel engine, or another type of combustion engine. In embodiments prime mover 18 is an electric powertrain including an electric motor operably coupled to at least one of ground engaging members 4, 6 and one or more batteries operably coupled to the electric motor. The powertrain may also include an air intake assembly 20, which is operably coupled to prime mover 18. Air intake assembly 20 is fluidly coupled to prime mover 18 at an engine air intake port 22. Illustratively, engine air intake port 22 is positioned at a first height H1 above a ground surface 38. Air intake assembly 20 also includes an air intake port 28 positioned within front portion 12 under hood member 36, and air intake portion 28 is positioned at a second height H2 above ground surface 38. Air intake assembly 20 also includes a conduit 26 extending forwardly from engine air intake port 22 to air intake port 28. That is, conduit 26 extends between engine air intake port 22 and air intake port 28. In embodiments, an air filter 24 is positioned along conduit 26 and may filter out particulates and debris before entering prime mover 18.

Figure 2:
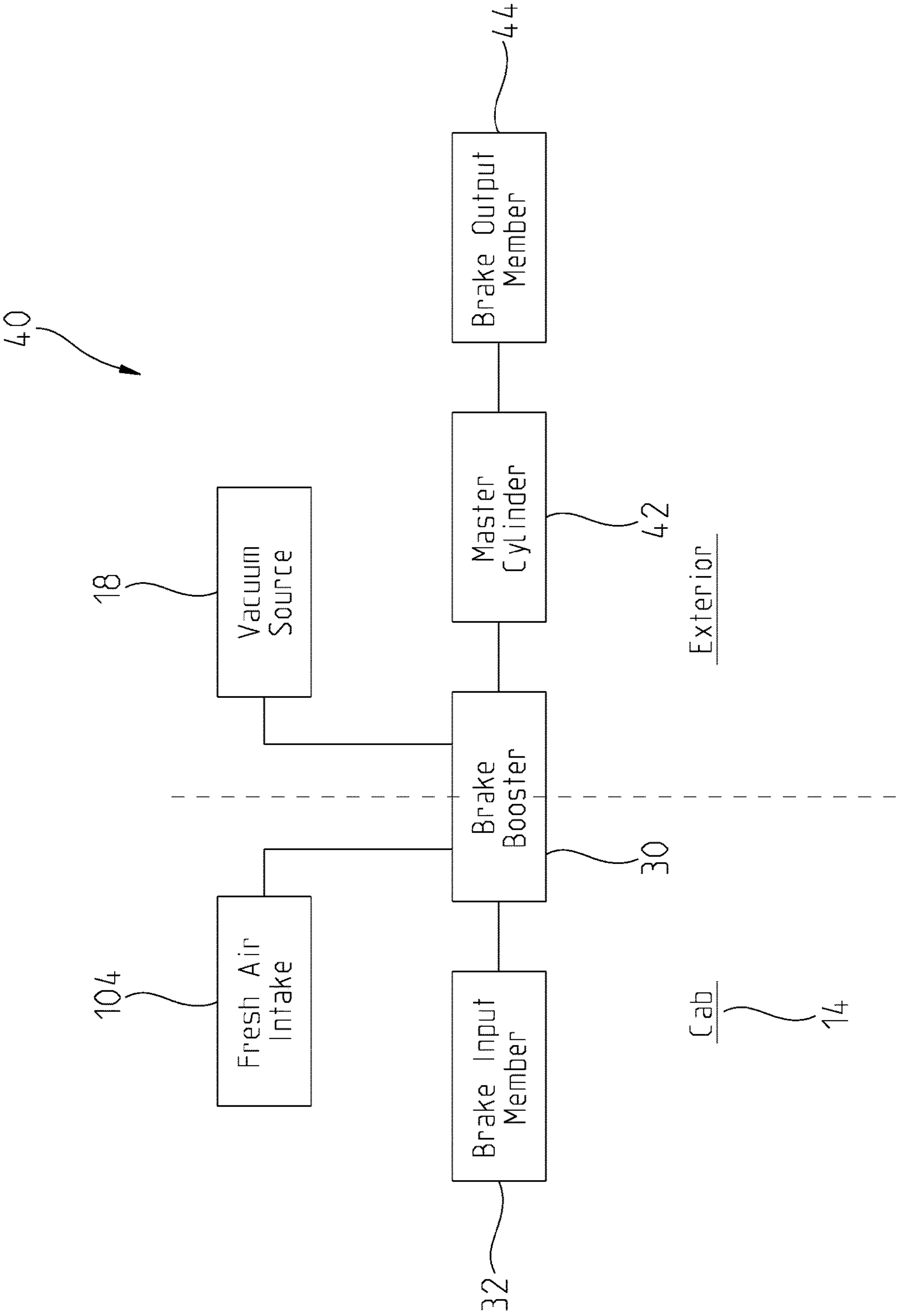
FIG. 2 is a diagrammatic view of a brake assembly of the present disclosure.

Referring to FIGS. 1-2, vehicle 2 includes a brake assembly 40 which may be operably coupled to one or more of the ground engaging members 4, 6. Brake assembly 40 includes a brake input member 32 positioned within the cab portion 14. Brake input member 32 may be actuatable (e.g., by an operator of vehicle 2 within cab portion 14). Brake assembly 40 also includes a master cylinder 42 fluidly coupled to at least one brake output member 44. In embodiments, vehicle 2 includes four brake output members 44, which may include one brake output member 44 associated with each ground engaging member of the pairs of ground engaging members 4, 6. In embodiments, brake output members 44 are brake calipers, drum brakes, or another type of brake member that may be actuated by hydraulic pressure. In embodiments, when master cylinder 42 is actuated, at least one of brake output members 44 are actuated.

Figure 3:
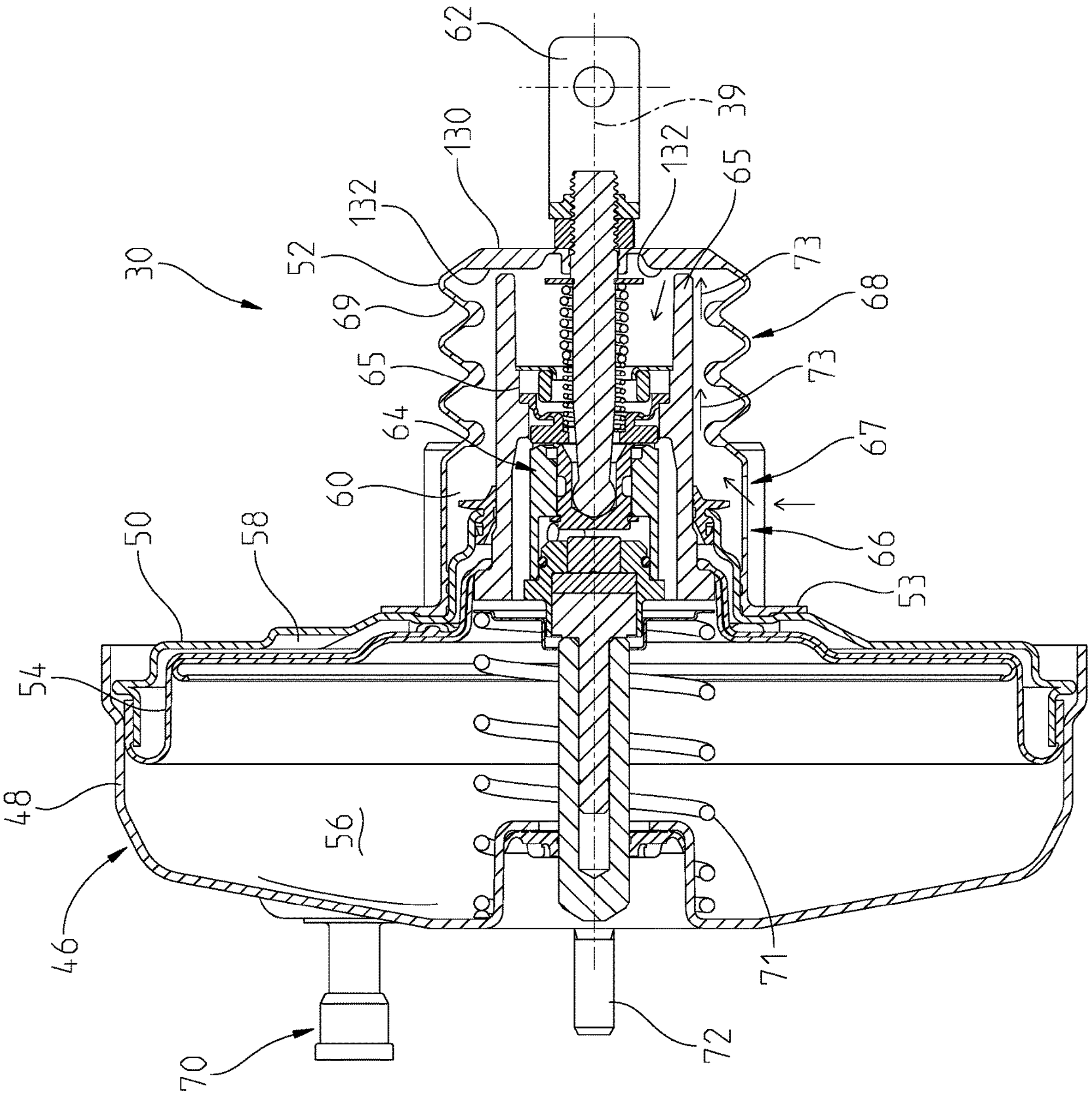
FIG. 3 is a section view of a brake booster assembly of the present disclosure.
Figure 4:
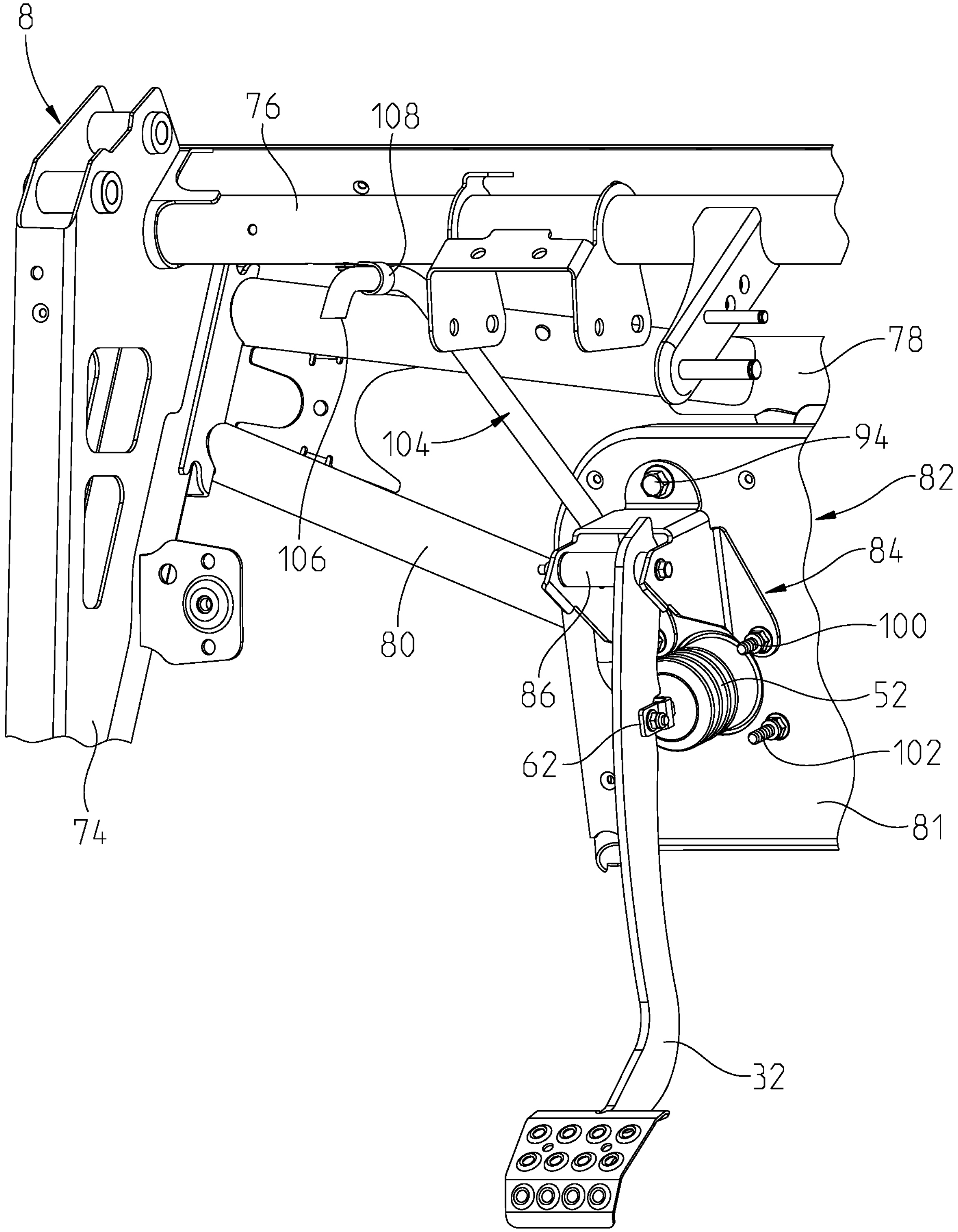
FIG. 4 is a perspective view of a frame assembly of the vehicle of FIG. 1 showing a portion of the brake assembly of FIG. 2.
Figure 5:
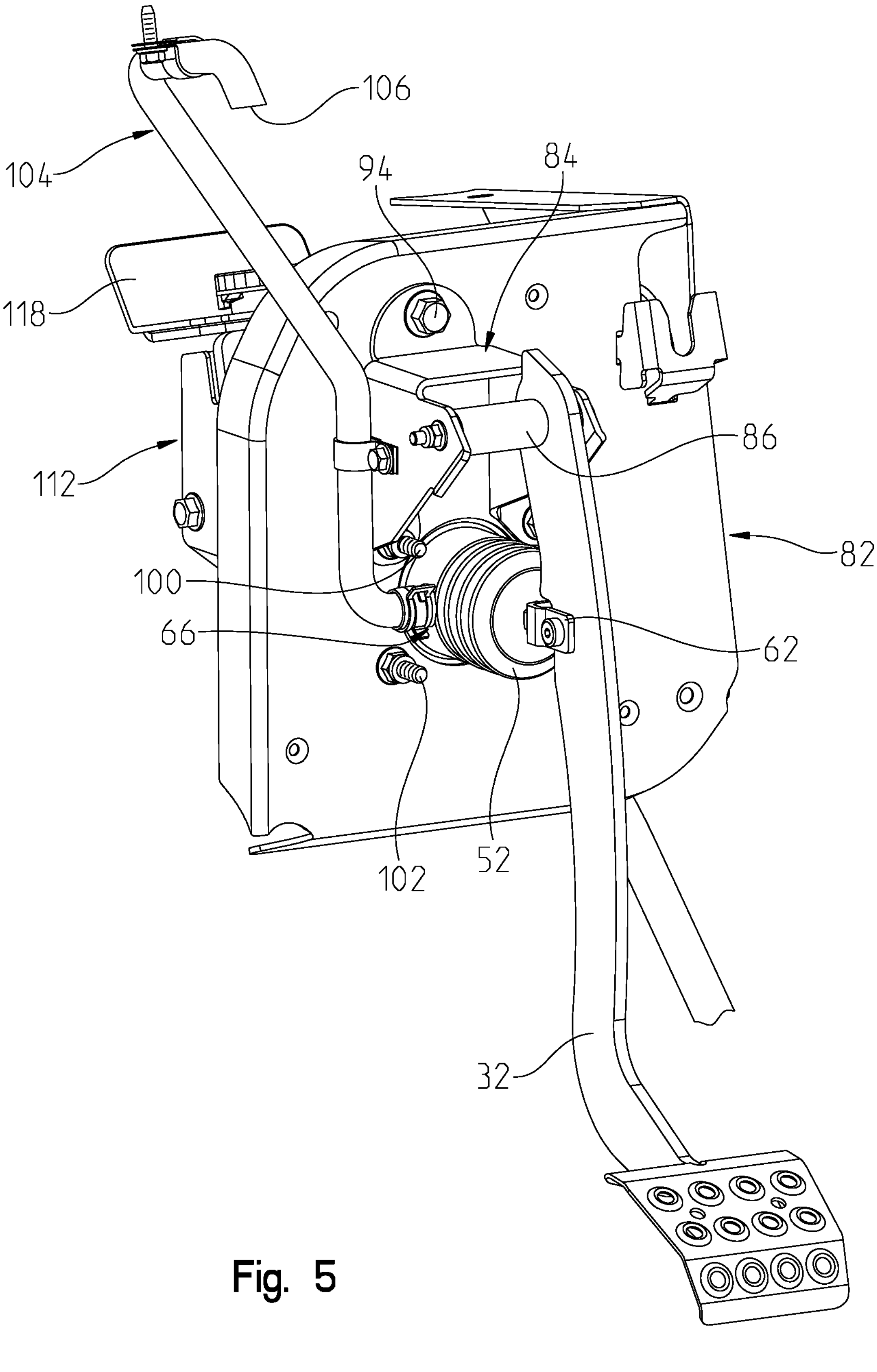
FIG. 5 is a perspective view of a frame assembly of the vehicle of FIG. 1 showing a portion of the brake assembly of FIG. 2.
Figure 6:
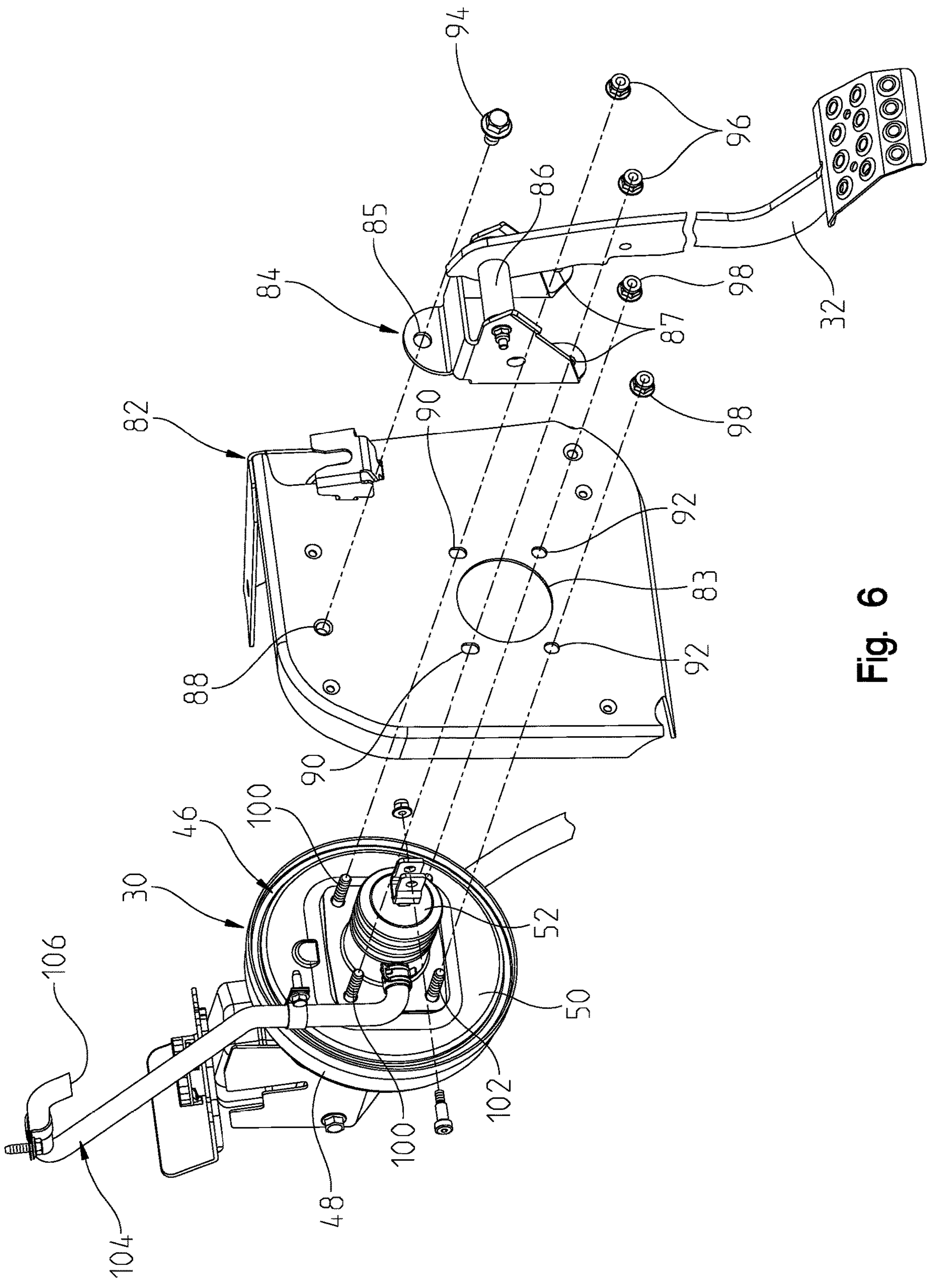
FIG. 6 is an exploded view of the frame assembly and brake assembly of FIG. 5.

Referring to FIG. 3, brake assembly 40 (FIG. 2) also includes a brake booster assembly 30 operably coupled between brake input member 32 (FIG. 2) and master cylinder 42 (FIG. 2). Brake booster assembly 30 includes a body 46 including a housing 48 that is generally concave. A cover 50 seals the housing 48, and a boot 52 extends outwardly opposite the housing 48. As illustrated, the boot 52 is operably coupled to the cover 50. A diaphragm 54 is positioned within housing 48 and diaphragm 54 is moveable within housing relative to cover 50. In embodiments, diaphragm 54 is a polymeric material, another flexible material, or a combination of materials (e.g., a metallic material and a polymeric material). In embodiments, body cover 50 is completely sealed to housing 48.

Brake booster assembly 30 includes a plurality of chambers, including a first chamber 56, a second chamber 58, and a third chamber 60. Illustratively, first chamber 56 is defined by the volume created between the housing 48 and the diaphragm 54, second chamber 58 is defined by the volume created between the cover 50 and diaphragm 54. That is, first chamber 56 and second chamber 58 are separated by diaphragm 54. Third chamber 60 is generally created by the volume within the boot 52. In embodiments, each of first chamber 56, second chamber 58, and third chamber 60 are independent chambers, but may be selectively fluidly coupled. In embodiments, first chamber 56 is selectively fluidly coupled to second chamber 58, and second chamber 58 is selectively fluidly coupled to third chamber 60. Brake booster assembly 30 includes valve assembly 64 positioned within boot 52. Valve assembly 64 is operable between a first position and a second position. For instance, in the first position, the valve assembly 64 is operable to fluidly couple first chamber 56 and second chamber 58. Further, in the second position, the valve assembly 64 is operable to fluidly couple the second chamber 58 to the third chamber 60. Brake booster assembly 30 also includes one or more arms, or extensions 65 which extend around valve assembly 64 to provide support for valve assembly 64.

Brake booster assembly 30 further includes an input push rod 62 and an output push rod 72. Input push rod 62 is operably coupled between brake input member 32 and valve assembly 64, and output push rod 72 is operably coupled to master cylinder 42. A biasing member 71 (e.g., a spring) is positioned intermediate diaphragm 54 and output push rod 72. An input (e.g., by a vehicle operator) to input push rod 62 from brake input member 32 is configured to move valve assembly 64 from the first position to the second position. Brake booster assembly 30 also includes a first fluid input 66 and a second fluid input 70. In embodiments, first fluid input 66 is a fresh air intake and is fluidly coupled to third chamber 60. Further, second fluid input 70 is a vacuum input fluidly coupled to first chamber 56. In embodiments, first fluid input 66 is configured to receive fresh air at a first pressure (e.g., atmospheric pressure). In embodiments, second fluid input 70 is fluidly coupled to air intake assembly 20 of prime mover 18. In embodiments, second fluid input 70 is fluidly coupled to air intake assembly 20 at a position between a throttle body (not shown) and the prime mover 18. That is, brake booster assembly 30 receives air at a second pressure less than the first pressure atmospheric pressure (e.g., vacuum air) from the powertrain assembly. Thus, prime mover 18 is a vacuum source for brake booster assembly 30. In embodiments, the vacuum source 18 may be a separate vacuum component configured to provide a vacuum pressure to brake booster assembly 30. In embodiments, vacuum source 18 is a mechanical vacuum pump attached to the prime mover, or an electric motor running a vacuum pump. In embodiments, the powertrain may be an electric powertrain with an electric motor, and the vacuum source may be a vacuum pump. In embodiments, the powertrain may be a diesel powertrain operably coupled to a mechanical pump configured to create a vacuum source. Thus, it will be appreciated that first chamber 56 is configured to hold a fluid at the second pressure (e.g., that is less than atmospheric pressure), and third chamber 60 is configured to hold a fluid at the first pressure (e.g., which is greater than the first pressure, for example that is generally atmospheric pressure).

Referring still to FIG. 3, brake booster assembly 30 is configured to operate between a first configuration, or neutral position, and a second configuration, or actuated position. In the neutral position, brake input member 32 is unactuated and valve assembly 64 is configured to be in a first position, such that first chamber 56 is fluidly coupled to the second chamber 58. That is, in the neutral position, brake input member 32 is unactuated and brake assembly 40 does not engage with prime members of vehicle 2. Further, in the neutral position, each of the first chamber 56 and second chamber 58 are fluidly coupled and each are at the first pressure (e.g., each of first chamber 56 and second chamber 58 are at a vacuum pressure). That is, in the neutral position, first chamber 56 and second chamber 58 are at the first pressure and the third chamber 60 is at the second pressure, where the first pressure is less than the second pressure. Each of the first chamber 56 and second chamber 58 are fluidly coupled to the second fluid input 70 and each house air at the first pressure. That is, each of first chamber 56 and second chamber 58 are in equilibrium, and diaphragm is in a neutral diaphragm position, unaffected by the pressure of air in either of the first chamber 56 and second chamber 58.

A user may actuate brake input member 32, which actuates input push rod 62 and actuates brake booster assembly 30. Input push rod 62 actuates valve assembly 64 and fluidly decouples first chamber 56 and second chamber 58, while also fluidly coupling second chamber 58 and third chamber 60. Third chamber 60 houses air at the second pressure (e.g., greater than the first pressure, which may approximately be atmospheric pressure) and when second chamber 58 is fluidly coupled with third chamber 60, second chamber 58 and third chamber 60 equalize to the second pressure. That is, in the actuated position, first chamber 56 is at the first pressure and the second chamber 58 and third chamber 60 are at the second pressure, and the first pressure is less than the second pressure. In the actuated position, second chamber 58 is over-pressured relative to first chamber 56, thereby creating a force on diaphragm 54 and pushing diaphragm 54 further into first chamber 56 and away from cover 50. As diaphragm 54 is pushed into first chamber 56 away from cover 50, spring 71 is compressed and output push rod 72 is actuated outwardly. Output push rod 72 actuates outwardly and actuates master cylinder 42, thereby actuating the brake output members 44 via hydraulic pressure. Thus, brake booster assembly 30 increases the amount of force provided to master cylinder 42 as a result of actuation of brake input member 32. Brake booster assembly 30 is a force multiplying assembly to increase the input force to the master cylinder 42 from the operator. That is, an input to brake input member 32 provides a first force to master cylinder 42, and the additional force created by the pressure differential within housing 48 provides a second, additional force, to master cylinder 42.

Referring now to FIGS. 4-7, frame 8 includes a first generally upstanding member 74 and a second generally upstanding member (not shown) laterally spaced from the first generally upstanding member. The first and second generally upstanding members generally support at least a portion of body assembly 10, including cab portion 14. A plurality of frame members extend between the first generally upstanding frame member and second generally upstanding frame member. The plurality of frame members includes a first laterally extending frame member 75, a second laterally extending frame member 78, and a third laterally extending frame member 80. A frame member, or plate 82, is coupled to at least one of frame members 76, 78, 80. In embodiments, frame member 82 is coupled to frame member 80. In embodiments, frame member 82 is coupled to frame member 78 and frame member 80. Further, frame member 82 has a front face 81 that defines an aperture 83 (FIG. 6) and an aperture 88. In embodiments, front face 81 is generally aligned with, or defines part of, body assembly 10. That is, front face 81 may define a portion of cab portion 14, such as a front panel 14A, or otherwise abut a portion of cab portion 14. In embodiments, frame member 82, and front face 81, may support a portion of cab portion 14. Plate 82 also defines a plurality of apertures 90 positioned vertically above aperture 83 and a plurality of apertures 92 positioned vertically below aperture 83.

A frame member 84 is operably coupled to face 81 of frame member 82, and brake input member 32 is rotatably coupled to frame member 84 about a rotation member 86. Additionally, brake input member 32 is operably coupled to frame member 82. Further, frame member 84 defines a first aperture 85 a pair of second apertures 87. A fastener 94 extends through aperture 85 and 88 to couple frame member 84 to frame member 82.

Brake booster assembly 30 is operably coupled to frame assembly 8. In embodiments, boot 52 of brake booster assembly 30 includes a flange portion 53 and flange portion 53 defines a plurality of apertures 55. Further, a first pair of studs 100 extend outwardly from cover 50 at a position vertically above boot 52 and a second pair of studs 102 extend outwardly from cover 50 at a position vertically below boot 52. In embodiments, each of studs 100, 102 are positioned radially outwardly from boot 52 and circumferentially spaced about boot 52. Further, each of studs 100, 102 extend through apertures 55. Further, studs 100 extend through apertures 90 of plate 82 and apertures 87 of frame member 84. A pair of nuts 96, or couplers, couple to studs 100 and secure frame member 84, plate 82, and brake booster assembly 30 together. Further, studs 102 extend through apertures 92 of plate 82. A pair of nuts 98, or couplers, couple to studs 102 and secure plate 82 and brake booster assembly 30 together. That is, a portion of studs (e.g., studs 102) on brake booster 30 are coupled to plate 82 and a portion of studs (e.g., studs 100) on brake booster 30 are coupled to each of frame member 82 and frame member 84.

Figure 7:
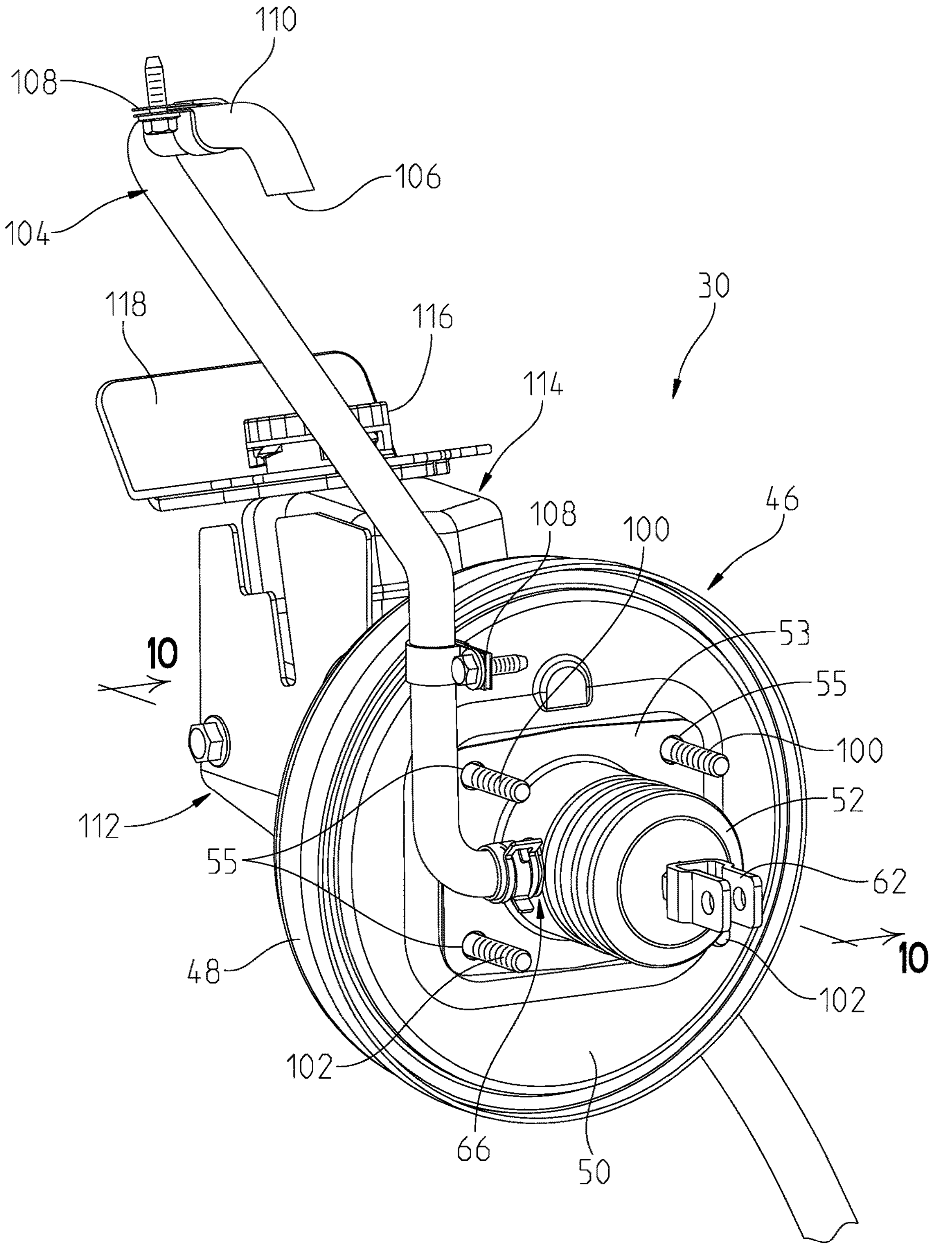
FIG. 7 is a perspective view of a portion of the brake assembly of FIG. 6.

Referring to FIG. 7, brake booster assembly 30 includes an intake conduit 104 coupled to boot 52 at the first fluid input 66. As illustrated in FIG. 1, boot 52 and intake conduit 104 are positioned within operator area 13. Referring again to FIG. 3, boot 52 includes a first portion 67 and a second portion 68. Illustratively, first portion 67 extends outwardly from flange portion 53 and second portion 68 extends outwardly from first portion 67. In embodiments, first portion 67 is generally cylindrical with a generally smooth, consistent surface, and second portion 68 is generally cylindrical with a plurality of folds 69 (e.g., similar to an accordion). Illustratively, intake conduit 104 extends outwardly from a side of boot 52, from first portion 67. Conduit 104 extends generally upwardly and a U-shaped portion 110 is positioned at an upward extent of conduit 104, and conduit 104 includes an inlet 106 pointing generally downwardly. Referring again to FIG. 1, the upward extent, or U-shaped portion 110 is positioned at a third height H3 above ground surface 38. A plurality of couplers 108 are coupled between conduit 104 and frame assembly 8 to couple conduit 104 to frame assembly 8.

Referring to FIG. 1, U-shaped portion 110 is positioned vertically higher than each of air intake port 28 and engine air intake port 22. That is, height H3 is greater than each of height H1 and height H2. Brake booster assembly 30 is sealed, and the only fluid input to brake booster assembly 30 is inlet 106. That is, if vehicle 2 is subjected to partial submersion within fluid (e.g., water), fluid will enter air intake 28 of prime mover 18 before inlet 106 of brake booster assembly 30. Vehicle 2 may have a water fording line with a height H4 (e.g., a level to which vehicle 2 can be submerged) that is approximately equal to the height of the seat bottom 11A. The water fording line may also be approximately equal to height H1, or approximately equal to height H2. That is, the height H3 of u-shaped portion 110 is higher than the water fording line, and body 46 may be submerged and fluid may not enter because body 46 is sealed which helps keep the interior of body 46 dry.

Still referring to FIGS. 4-7, brake assembly 40 includes a reservoir 114 with a removable cover 116. Reservoir 114 is fluidly coupled to master cylinder 42, and a fluid (e.g., brake fluid) is configured to fill each of reservoir 114 and master cylinder 42. Illustratively, a bracket 112 is configured to support and shield reservoir 114. Referring to FIG. 1, brake booster assembly 30 is generally angled relative to a ground surface 38. That is, an axis 39 generally extends along input push rod 62 and output push rod 72, and axis 39 is angled relative to ground surface 38. Further, the forward end (e.g., the end adjacent output push rod 72) is positioned vertically higher than the rearward end (e.g., the end adjacent input push rod 62). In embodiments, the forward end (e.g., the end adjacent output push rod 72) is positioned vertically lower than the rearward end (e.g., the end adjacent input push rod 62). In embodiments, brake booster assembly is generally level to the ground (e.g., input push rod 62 is nominally parallel to the ground surface 38).

Figure 8:
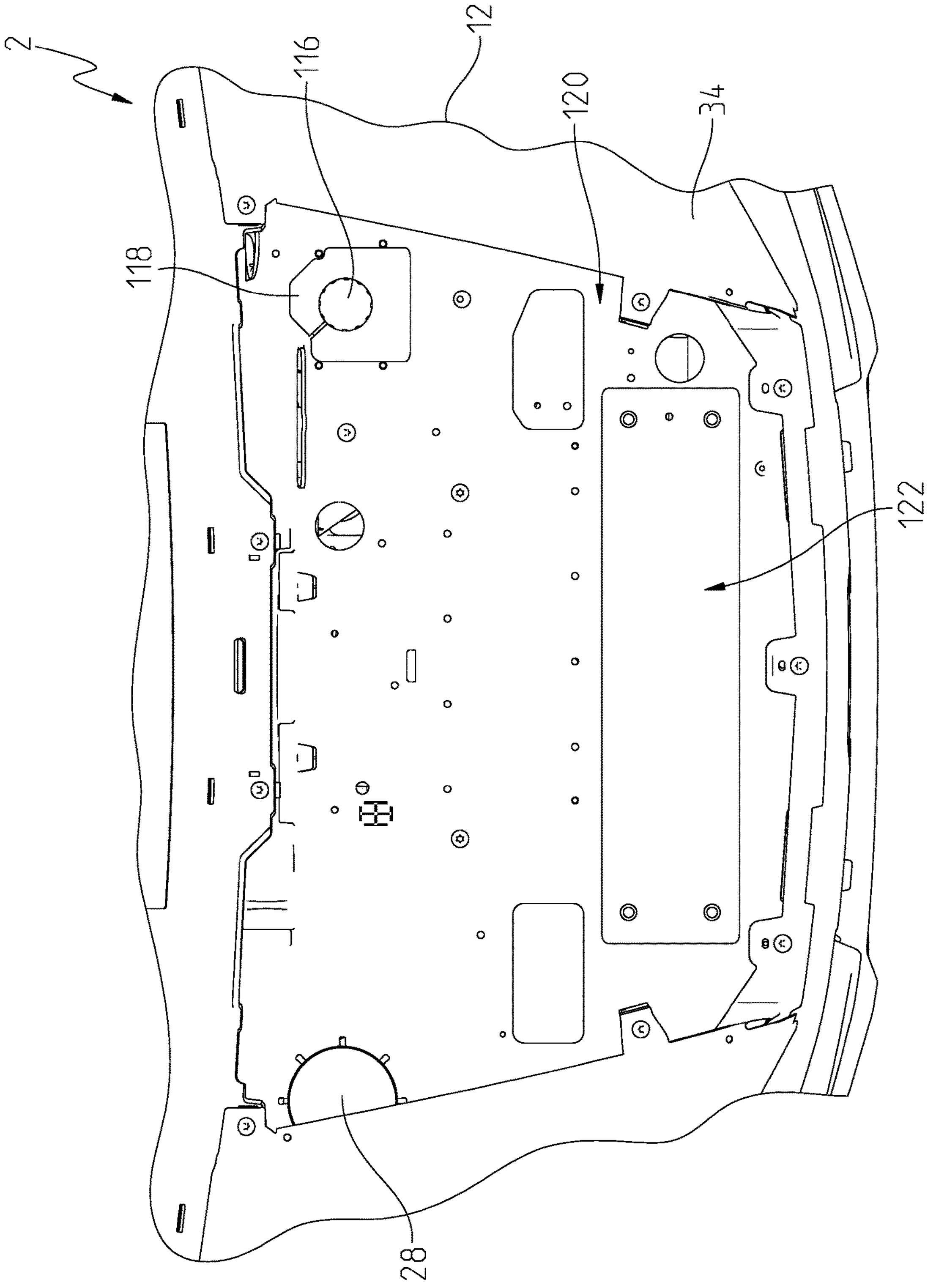
FIG. 8 is a top view of the front portion of the vehicle of FIG. 1 with the hood removed.
Figure 9:
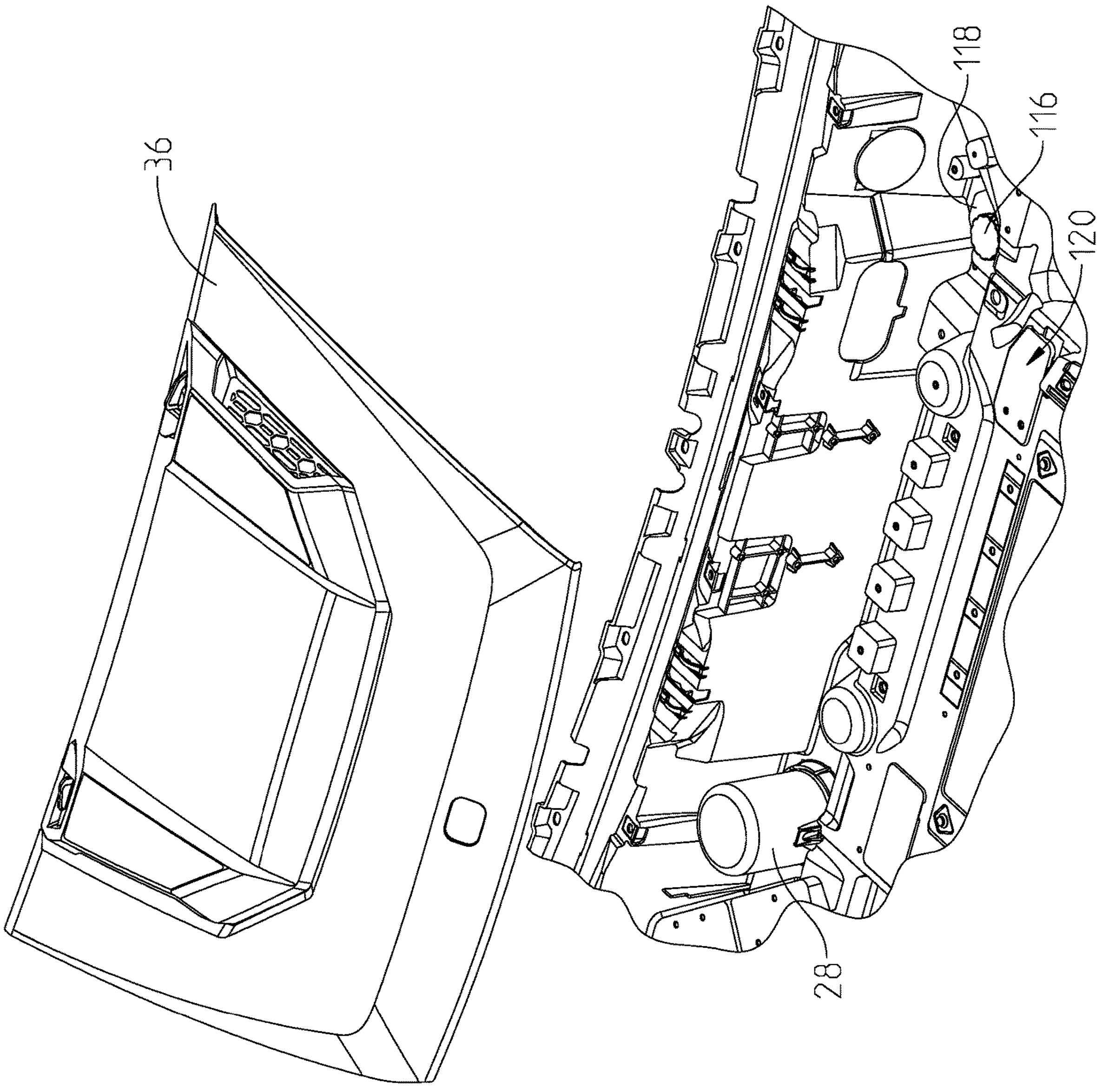
FIG. 9 is an exploded view of the front portion of the vehicle of FIG. 1 with the hood removed.

Now referring to FIGS. 8-9, front portion 12 includes a plate member 120, or hood liner 120, positioned vertically below hood member 36. Illustratively, air intake port 28 extends upwardly through plate member 120 and is positioned below hood member 36. Further, removable cover 116 extends upwardly through plate member 120 and is positioned below hood member 36. A bracket 118 is coupled to plate member 120, and removable cover 116 extends through plate member 120 and bracket 118. In embodiments, bracket 118 is a grommet made of rubber, or another polymer, and is configured to provide additional sealing between plate member 120 and reservoir 114. In embodiments, plate member 120, or hood liner 120, is removable to allow access to the brake booster assembly 30. That is, brake booster assembly 30 may be removable without removing external body panels (e.g., body 10). In embodiments, hood member 36 is removable to reveal each of removable cover 116 and air intake port 28. Removable cover 116 allows for access to reservoir 114 from a position below hood member 36 which may be cleaner and easier to access than other areas on vehicle 2 (e.g., an area within the wheel well that may experience debris, fluids, dirt, etc.). In embodiments, hood member 36 is removable to reveal a portion of the powertrain (e.g., air intake port 28) and a portion of the brake assembly (e.g., removable cover 116 of brake assembly 40). In embodiments, plate member 120 is configured to support a portion of an electrical assembly (e.g., an antenna 122). That is, hood member 36 may be removable to reveal a portion of the electrical assembly (e.g., antenna 122).

Still referring to FIG. 1, brake booster assembly 30 is configured to be supported by frame 8 and extend across the boundary defined by operator area 13. In embodiments, boot 52 and conduit 104 are positioned within operator area 13. That is, inlet 106 of intake conduit 104 is positioned within operator area 13 to receive clean air from operator area 13. Housing 48 of brake booster 30 is positioned vertically above ground engaging member 4 and may be subject to debris, mud, or water kicking up from ground engaging member 4. Housing 48 and cover 50 are completely sealed and debris, mud, or water may not enter brake booster 30 through housing 48 or cover 50.

In embodiments, body 46 of brake booster assembly 30 is manufactured by sealingly coupling cover 50 to housing 48. Further, studs 100, 102 are configured to extend through flange portion 53 of boot 52 to sealingly couple boot 52 to cover 50. In this configuration, the interior of body 46 may only be accessed by first fluid input 66 and second fluid input 70.

Figure 10:
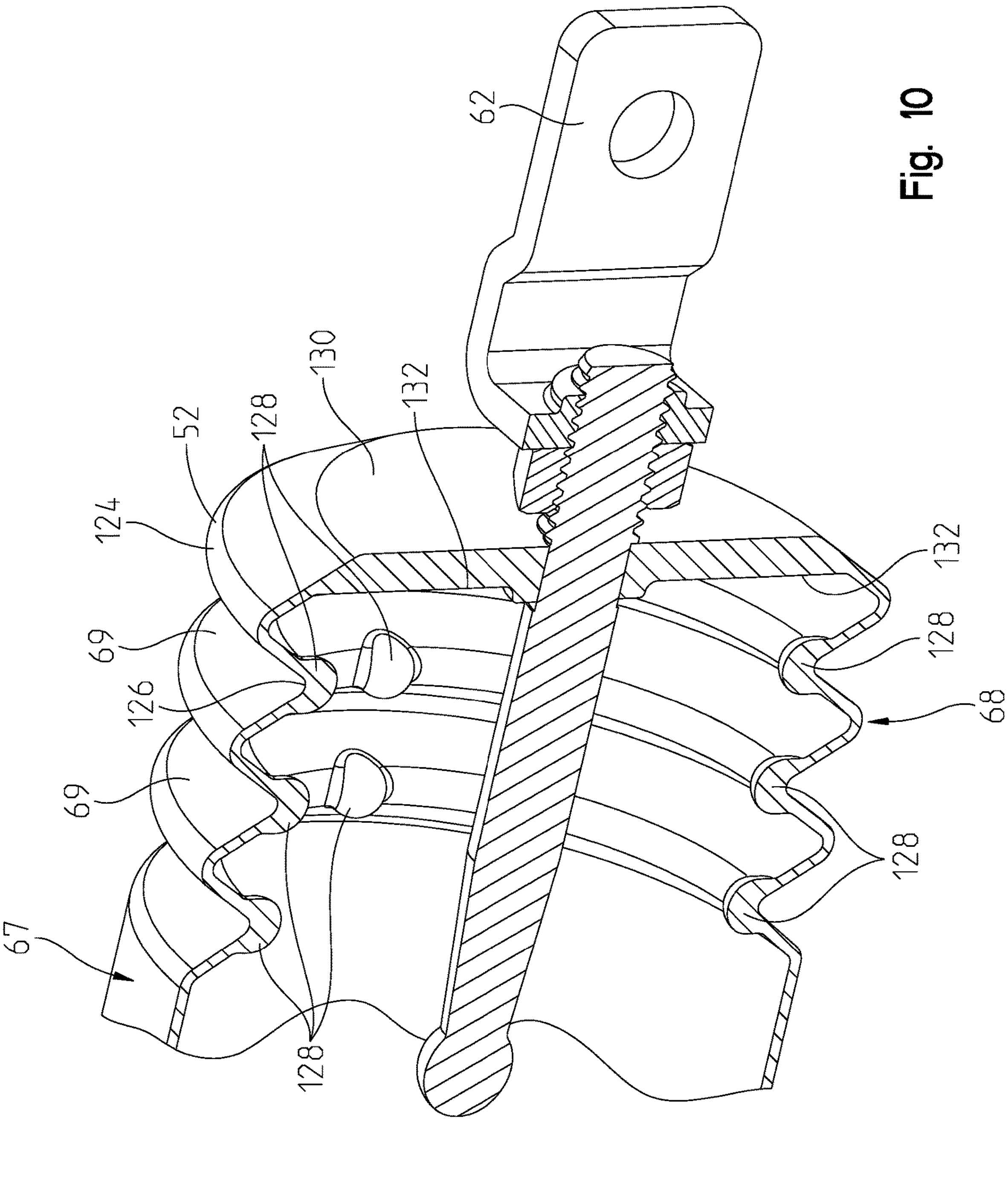
FIG. 10 is a section view of a portion of the brake assembly, taken along line 10-10 of FIG. 7.

Referring now to FIG. 10, folds 69 on second portion 68 of boot 52 comprise an apex 124 and a base 126. In embodiments, each base 126 of folds 69 comprises at least one bulb, or node 128, or bulbous region 128, which comprises a greater thickness than other portions of folds 69. As second portion 68 of boot 52 compresses and expands during actuation of input push rod 62, folds 69 may fold in on each other. In embodiments, bulbs 128 are configured to prevent folds 69 from sticking together, or otherwise creating a vacuous region within the folds 69 and sealing in on itself. That is, bulbs 128 are configured to ensure separation between folds 69. In embodiments, bulbs 128 are spaced about relative to extension 65 and help promote separation between boot 52 extension 65 so that air may travel through boot 52 around extension 65. That is, bulbs 128 help ensure that boot 52 doesn't seal against extension 65 to allow air-flow around extension 65.

Figure 11:
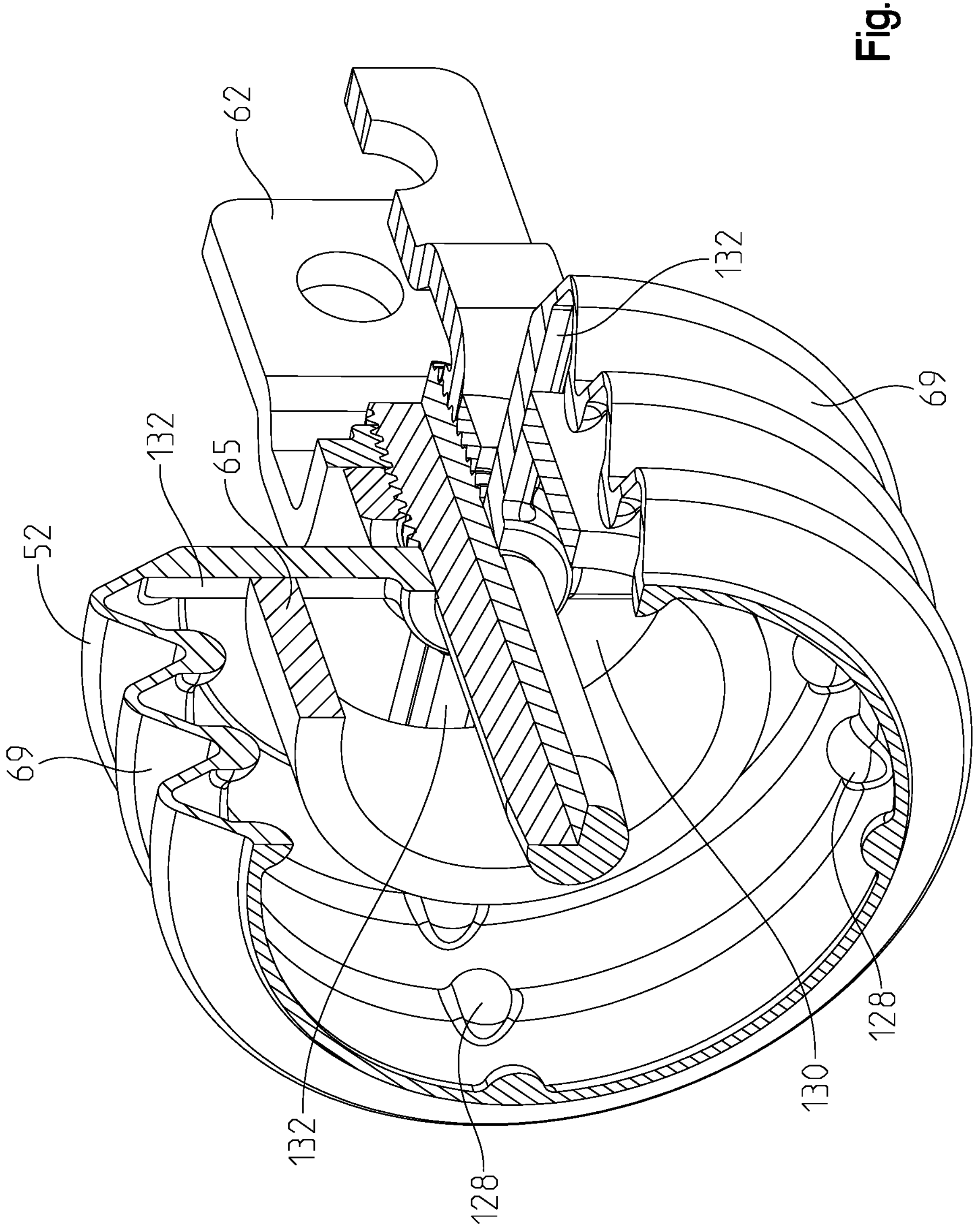
FIG. 11 is a perspective section view of the portion of the brake assembly of FIG. 10.

Referring to FIG. 11, boot 52 comprises an end cap 130 surrounding input push rod 62. In embodiments, end cap 130 of boot 52 is sealingly coupled around input push rod 62. End cap 130 comprises at least one ridge 132 on an interior of boot 52 that extends outwardly from end cap 130. Ridges 132 are configured to contact extensions 65 so that air, or fluid, may travel over extensions 65 around ridges 132. Illustratively, referring to FIG. 3, air is configured to enter boot 52 at first fluid input 66 and travel along the path defined by arrows 73 around extensions 65.

The following clauses illustrate example subject matter described herein.

Clause 1. A vehicle, comprising: a plurality of ground engaging members; a frame supported by the plurality of ground engaging members; an engine supported by the frame, the engine comprising an engine intake that includes an engine intake inlet; and a brake assembly, comprising: a brake output member coupled to at least one ground engaging member of the plurality of ground engaging members; a master cylinder coupled to the brake output member; and a brake booster operably coupled to the master cylinder, the brake booster comprising a body defining a fresh air intake, a conduit extending outwardly from the fresh air intake, and an inlet to the conduit positioned vertically above the brake booster.

Clause 2. The vehicle of clause 1, further comprising a vehicle body supported by the frame, the vehicle body comprising a hood, and wherein the engine intake inlet is positioned underneath the hood.

Clause 3. The vehicle of clause 1, further comprising an operator area supported by the frame, the operator area partially defined by a front panel, and wherein a portion of the brake booster extends through the front panel.

Clause 4. The vehicle of clause 1, wherein the brake booster further comprises a housing and a diaphragm within the housing, a cover coupled to the housing, a boot coupled to the housing, and the fresh air intake is fluidly coupled to the boot.

Clause 5. The vehicle of clause 4, wherein the boot has a first portion including a plurality of folds, and at least one fold of the plurality of folds comprises a node configured to separate the at least one fold from the plurality of folds.

Clause 6. The vehicle of clause 5, wherein the boot comprises a second portion offset from the first portion, and the fresh air intake is coupled to the second portion.

Clause 7. A braking system for a vehicle, comprising: a plurality of brake output members; a brake input member; a master cylinder configured to supply hydraulic fluid to at least one of the plurality of brake output members; and a brake booster operably coupled between the brake input member and the master cylinder, the brake booster comprising: a casing; a diaphragm positioned within the casing; an input shaft operably coupled between the diaphragm and the brake input member; a boot surrounding at least a portion of the input shaft; and a fresh air intake fluidly coupled to the boot.

Clause 8. The braking system of clause 7, wherein the housing is fluidly coupled an engine intake.

Clause 9. The braking system of clause 8, wherein the engine intake comprises an intake inlet, and a portion of the fresh air intake is positioned vertically above the intake inlet.

Clause 10. The braking system of clause 8, wherein the boot comprises a first portion and a second portion, and the first portion comprises a plurality of folds, and the fresh air intake is fluidly coupled to the second portion.

Clause 11. The braking system of clause 10, further comprising a node positioned on at least one fold of the plurality of folds, and the node is configured to separate the at least one fold from the plurality of folds.

Clause 12. The braking system of clause 8, wherein the boot is sealingly coupled to the housing.

Clause 13. The braking system of clause 8, wherein the boot is sealingly coupled about the input shaft.

Clause 14. A method of manufacture of a brake booster, the method comprising: providing a housing, a cover, a diaphragm, an input rod, and a boot; inserting the diaphragm into the housing; sealingly coupling the cover to the housing, thereby sealing the diaphragm between the housing and the cover; and sealingly coupling the boot to the cover, the boot sealed about the input rod.

Clause 15. The method of manufacture of clause 14, further comprising: providing a fluid conduit; and fluidly coupling the fluid conduit to the boot.

Clause 16. The method of manufacture of clause 15, further comprising: providing an inlet to the fluid conduit; and positioning the inlet at a position above the brake booster.

Clause 17. The method of manufacture of clause 14, the boot comprising a first portion and a second portion, the method comprising: providing a bulbous region on the first portion of the boot; providing an air inlet on the second portion of the boot; providing a fluid conduit; and coupling the fluid conduit to the air inlet.

Clause 18. The method of manufacture of clause 14, further comprising: providing a vehicle frame member; and coupling the brake booster to the vehicle frame member by coupling the at least one stud to the vehicle frame member.

Clause 19. The method of manufacture of clause 14, further comprising: providing at least one stud coupled to the cover, the at least one stud extending through a portion of the boot.

Clause 20. The method of manufacture of clause 19, further comprising: providing a pedal member; coupling the pedal member to the at least one stud.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicle, comprising:

a plurality of ground engaging members;

a frame supported by the plurality of ground engaging members;

an engine supported by the frame, the engine comprising an engine intake that includes an engine intake inlet; and a brake assembly, comprising:

a brake output member coupled to at least one ground engaging member of the plurality of ground engaging members;

a master cylinder coupled to the brake output member; and a brake booster operably coupled to the master cylinder, the brake booster comprising:

a body defining a fresh air intake;

a conduit extending outwardly from the fresh air intake;

an inlet to the conduit positioned vertically above the brake booster; and a valve assembly;

an input rod operatively coupled between a brake input member and the valve assembly;

a boot including a boot wall that surrounds at least a portion of the input rod;

a first fluid input that fluidly connects to a source of vacuum to the brake booster; and a second fluid input that communicates fresh air to an interior of the boot, the second fluid input including the fresh air intake opening, wherein the valve assembly is positioned at least partially in the boot and is configured to receive air from inside the boot, wherein the conduit includes a bend at an upward portion of the conduit and the inlet to the conduit is below the height of the bend, the inlet to the conduit facing downwardly.

2. The vehicle of claim 1, further comprising a vehicle body supported by the frame, the vehicle body comprising a hood, and wherein the engine intake inlet is positioned underneath the hood.

3. The vehicle of claim 1, further comprising an operator area supported by the frame, the operator area partially defined by a front panel, and wherein a portion of the brake booster extends through the front panel.

4. The vehicle of claim 1, wherein the brake booster further comprises a housing and a diaphragm within the housing, a cover coupled to the housing, the boot coupled to the housing, and the fresh air intake is fluidly coupled to the boot.

5. The vehicle of claim 4, wherein the boot has a first portion including a plurality of folds, and at least one fold of the plurality of folds comprises a node configured to separate the at least one fold from the plurality of folds.

6. The vehicle of claim 5, wherein the boot comprises a second portion offset from the first portion, and the fresh air intake is coupled to the second portion.

7. The vehicle of claim 1, wherein a height of a position of the inlet to the conduit is higher than a ford line of the vehicle.

8. A braking system for a vehicle, comprising:
a plurality of brake output members;
a brake input member;
a master cylinder configured to supply hydraulic fluid to at least one of the plurality of brake output members; and
a brake booster operably coupled between the brake input member and the master cylinder, the brake booster comprising:
a housing fluidly coupled to an engine intake;
a diaphragm positioned within the housing;
an input shaft operably coupled between the diaphragm and the brake input member;
a boot sealingly coupled about the input shaft, wherein the boot is also sealingly coupled to the housing; and
a fresh air intake fluidly coupled to the boot, and
a conduit extending from the fresh air intake, the conduit having a bend at an upward portion of the conduit and an inlet below a height of the bend, the inlet facing downwardly.

9. The braking system of claim 8, wherein the boot comprises a first portion and a second portion, and the first portion comprises a plurality of folds, and the fresh air intake is fluidly coupled to the second portion.

10. The braking system of claim 9, further comprising a node positioned on at least one fold of the plurality of folds, and the node is configured to separate the at least one fold from the plurality of folds.

11. A vehicle, comprising the braking system of claim 8, wherein the vehicle has a ford line and a height of a position of the inlet to the conduit is higher than the ford line of the vehicle.

12. A method of manufacture of a brake booster, the method comprising:
providing a housing, a cover, at least one stud coupled to the cover, a diaphragm, an input rod, a pedal member, and a boot, the at least one stud extending through a portion of the boot;
inserting the diaphragm into the housing;
sealingly coupling the cover to the housing, thereby sealing the diaphragm between the housing and the cover;
sealingly coupling the boot to the cover, the boot sealed about the input rod;
coupling the pedal member to the at least one stud;
providing an air intake conduit, wherein the air intake conduit includes a bend and an inlet;
fluidly coupling the air intake conduit to the boot, such that the bend is at an upward portion of the conduit when the brake booster is positioned to be mounted in a vehicle, and the inlet is below the height of the bend, the inlet to the conduit facing downwardly.

13. The method of claim 12, further comprising mounting the brake booster in a vehicle such that a position of the inlet to the air intake conduit is higher than a ford line of the vehicle.

14. A braking system for a vehicle, comprising:
a plurality of brake output members;
a brake input member;
a master cylinder configured to supply hydraulic fluid to at least one of the plurality of brake output members; and
a brake booster operably coupled between the brake input member and the master cylinder, the brake booster comprising:
a valve arrangement;
first, second and third chambers, the second chamber being located between the first and third chambers, the first and second chambers being separated by a diaphragm, the third chamber being defined by a boot, the boot having a boot wall that surrounds an axis of the brake booster and includes at least a portion that is configured to collapse in an orientation along the axis of the brake when the brake booster is actuated by the brake input member;
a first fluid input that fluidly connects to a source of vacuum to an interior of the first chamber;
a second fluid input that communicates fresh air to an interior of the third chamber, the second fluid input including a fresh air intake opening defined through the boot wall;
a conduit fluidly connected to the second fluid input, wherein the conduit includes a bend at an upward portion of the conduit and an inlet to the conduit, wherein the inlet to the conduit is below the height of the bend and the inlet to the conduit faces downwardly, the inlet to the conduit being at a height above the brake booster; and
wherein the valve arrangement is configurable in a first state in which the brake booster is not actuated and a second state in which the brake booster is actuated, wherein when the valve arrangement is in the first state the first chamber is in fluid communication with the second chamber and the second chamber is not in fluid communication with the third chamber, and wherein when the valve arrangement is in the second state the second chamber in fluid communication with the third chamber and the second chamber is not in fluid communication with the first chamber.

15. The braking system of claim 14, wherein the boot includes a non-collapsible portion and a collapsible portion, and wherein the fresh air intake opening is defined through the non-collapsible portion.

16. The braking system of claim 15, wherein the collapsible portion has a pleated configuration with nodes for limiting an amount the pleated configuration can be collapsed.

17. The braking system of claim 15, wherein the conduit is mounted at an exterior of the boot wall.

18. The braking system of claim 14, wherein an air flow path is defined within the boot from the fresh air intake opening to the valve arrangement.

19. A vehicle, comprising the braking system of claim 14, wherein the vehicle has a ford line and a height of a position of the inlet to the conduit is higher than the ford line of the vehicle.

* * * * *